(12) United States Patent
Moon et al.

(10) Patent No.: US 9,091,878 B2
(45) Date of Patent: Jul. 28, 2015

(54) LIQUID CRYSTAL DISPLAY FOR PREVENTING A LIGHT LEAKAGE

(71) Applicant: LG DISPLAY CO., LTD., Seoul (KR)

(72) Inventors: Sunji Moon, Seoul (KR); Dukkeun Yoo, Seoul (KR); Sehong Park, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 226 days.

(21) Appl. No.: 13/706,077

(22) Filed: Dec. 5, 2012

(65) Prior Publication Data

US 2013/0141679 A1 Jun. 6, 2013

(30) Foreign Application Priority Data

Dec. 6, 2011 (KR) .................. 10-2011-0129832
Oct. 30, 2012 (KR) .................. 10-2012-0121128

(51) Int. Cl.
*G02F 1/1339* (2006.01)
*G02F 1/1335* (2006.01)

(52) U.S. Cl.
CPC ........ *G02F 1/133512* (2013.01); *G02F 1/1339* (2013.01)

(58) Field of Classification Search
CPC .................... G02F 1/133512; G02F 1/1339
USPC .................................. 349/110, 153
See application file for complete search history.

(56) References Cited

U.S. PATENT DOCUMENTS 6,259,505 B1 * 7/2001 Makino .................. 349/153
2008/0111965 A1 * 5/2008 Tomita .................. 349/156

* cited by examiner

*Primary Examiner* — Phu Vu
(74) *Attorney, Agent, or Firm* — Birch, Stewart, Kolasch & Birch, LLP

(57) ABSTRACT

A liquid crystal display for preventing a light leakage is discussed. According to an embodiment, the liquid crystal display panel includes a first substrate having a black matrix that defines a non-display region and a display region, a second substrate on which a pixel array is formed, a liquid crystal layer between the first substrate and the second substrate, and a sealant between the first substrate and the second substrate, wherein a distance between the sealant and the black matrix is different in accordance with a position on which the sealant is formed.

5 Claims, 8 Drawing Sheets

LIQUID CRYSTAL DISPLAY FOR PREVENTING A LIGHT LEAKAGE

This application claims the benefit of Korean Patent Application Nos. 10-2011-0129832 filed on Dec. 6, 2011, and 10-2012-0121128 filed on Oct. 30, 2012, which are all incorporated herein by reference for all purposes as if fully set forth herein.

BACKGROUND

1. Field

The disclosure relates to a liquid crystal display for preventing a light leakage.

2. Discussion of the Related Art

Liquid crystal displays are devices that display an image by adjusting the light transmittance of liquid crystals, where a liquid crystal panel formed by disposing liquid crystals between substrates adjusts the transmittance of light supplied from a backlight unit, thereby displaying an image.

The liquid crystals between the substrates are initially arranged in accordance with the alignment direction of alignment layers disposed to the substrates, and when an electric field is applied, the amount of transmitted light is adjusted as alignment direction is changed in accordance with the direction of the electric field. However, there is a problem in that light leaks from the liquid crystal panel, when the initial alignment state is changed by various factors.

For example, when the alignment layer is damaged by a column spacer, the liquid crystals are not arranged in a desired direction at the damaged portion of the alignment layer, such that light leakage occurs at the portion.

Alternatively, other than the light leakage due to a defect of the liquid crystal display panel, light leakage occurs, even when the liquid crystal display panel is bent by a mechanical fault in the process of modularizing the liquid crystal display panel.

For example, a cover bottom is combined with a top case with the liquid crystal display panel and the backlight unit therebetween, thereby modularizing the liquid crystal display panel and the backlight unit. In this process, when a difference is generated in the combining force applied to the liquid crystal display panel, the liquid crystal display panel is bent, such that light leaks from the liquid crystal display panel.

SUMMARY

An aspect of the present invention is to reduce light leakage from a liquid crystal display panel.

An exemplary embodiment of the present invention provides a liquid crystal display panel that includes: a first substrate having a black matrix that defines a non-display region and a display region; a second substrate on which a pixel array is formed; a liquid crystal layer between the first substrate and the second substrate; and a sealant between the first substrate and the second substrate, wherein a distance between the sealant and the black matrix is different in accordance with a position on which the sealant is formed.

The distances between the sealant and the black matrix are formed of an M-shape.

The sealant is the farthest from black matrix at the one-quarter points and the three-quarter points on a long side and a short side of the liquid crystal display panel.

The sealant is the closest to the black matrix at the two-quarter points on the long side and the short side.

The sealant is rounded at the one-quarter point, the two-quarter point, and the three-quarter point.

In an exemplary embodiment of the present invention described above, the sealant is the farthest from the black matrix at the one-quarter point and the three-quarter point of the liquid crystal display panel. Therefore, the region that is filled with liquid crystals increases in proportion to the increased distance, such that distribution of the liquid crystals is increased. As a result, the stress that is exerted in the one-quarter point and the three-quarter point reduces in inverse proportion to the increased liquid crystals, such that it is possible to prevent light leakage that is generated, when the arrangement of liquid crystals falls into disorder at the points due to the stress.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

In the drawings.

DETAILED DESCRIPTION

Figure 1:
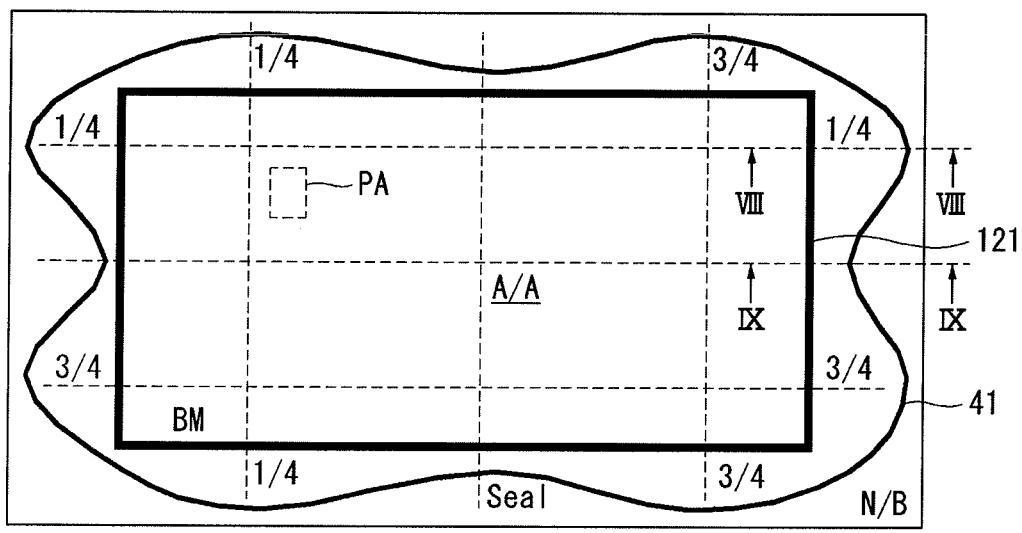
FIG. 1 is a diagram illustrating the distance between a sealant and a black matrix according to an exemplary embodiment of the present invention.

Hereinafter, exemplary embodiments of the present invention will be described with reference to the accompanying drawings. The like reference numerals indicate substantially the like components throughout the specification. However, in the following description, detailed descriptions of well-known functions or configurations relating to the present invention will not be provided so as not to obscure the description of the present invention with unnecessary detail.

Figure 2:
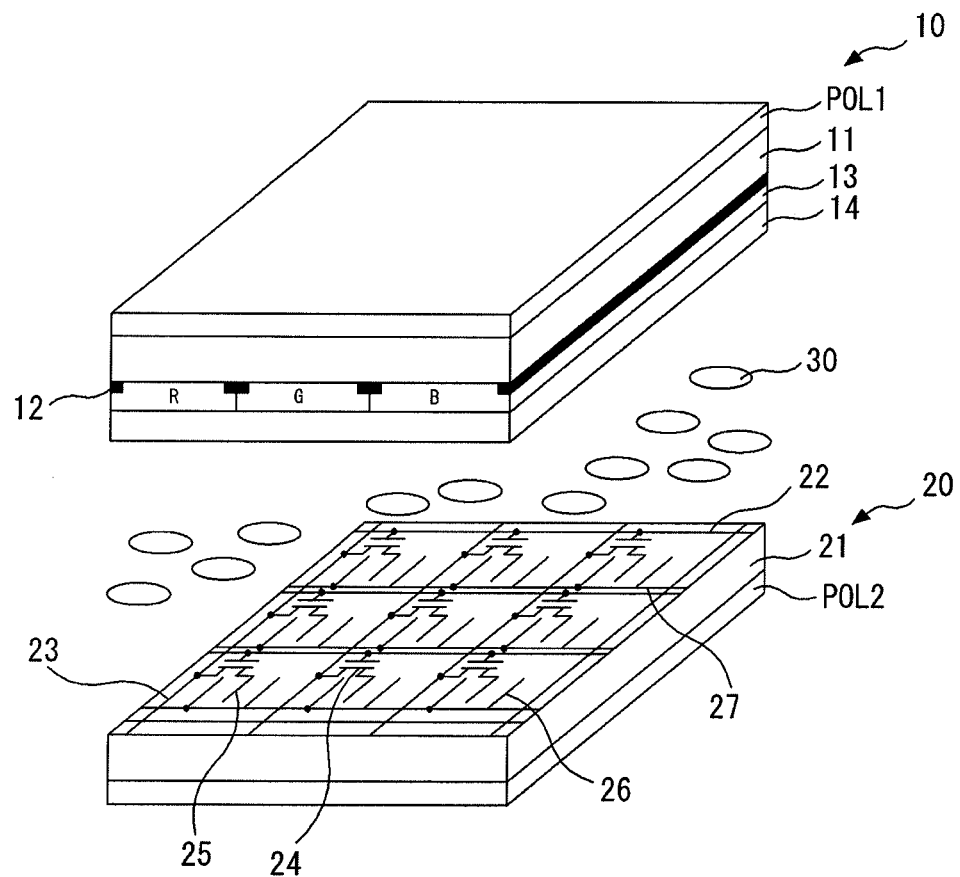
FIG. 2 is an exploded perspective view illustrating the area PA in FIG. 1.

FIG. 1 is a diagram illustrating a sealant in a non-display region according to an exemplary embodiment of the present invention and FIG. 2 is an exploded perspective view of the portion PA of FIG. 1.

In FIGS. 1 and 2, a liquid crystal display panel according to an exemplary embodiment of the present invention includes a color filter substrate 10 and a thin film transistor array substrate 20 that are bonded with a liquid crystal layer 30 therebetween to implement a liquid crystal cell. Further, the liquid crystal display panel includes an upper polarizer POL1 attached to the upper surface of the color filter substrate 10 and a lower polarizer POL2 attached to the lower surface of the thin film transistor array substrate 20. The light absorption axes of the upper polarizer POL1 and the lower polarizer POL2 are perpendicular to each other.

The color filter substrate 10 includes an upper glass substrate 11, a black matrix 12, a color filter 13 for displaying colors, and a planarizing layer 14 for planarizing steps of the color filter 13.

The thin film transistor array substrate 20 includes a pixel array formed on a lower glass substrate 21. The pixel array includes gate lines 22, data lines 23 that intersect the gate lines 22, with a gate insulating layer GI therebetween, liquid crystal cells that are formed at the intersections of the gate lines 22 and the data lines 23, thin film transistors 24 that are connected with pixel electrodes 25 of the liquid crystal cells, common electrodes 26 that are opposite the pixel electrodes 25, a passive layer PAS that is formed to protect the pixel electrodes 25 and the common electrodes 26, and common lines 27 through which a common voltage is supplied to the common electrodes 26.

The thin film transistor 24 supplies a pixel signal of the data line 23 to the pixel electrode 25 in response to a gate signal of the gate line 22. For this operation, a gate electrode and a source electrode of the thin film transistor 24 are connected to the gate line 22 and the data line 23, respectively. Further, a drain electrode of the thin film transistor 24 is connected to the pixel electrode 25.

The common electrodes 26, in a horizontal electric field driving method such as an IPS (In Plane Switching) mode and an FFS (Fringe Field Switching) mode, is formed on the lower glass substrate together with the pixel electrode; however, they are formed on the upper glass substrate in a vertical electric field driving method such as a TN (Twisted Nematic) mode and a VA (Vertical Alignment) mode.

Figure 8:
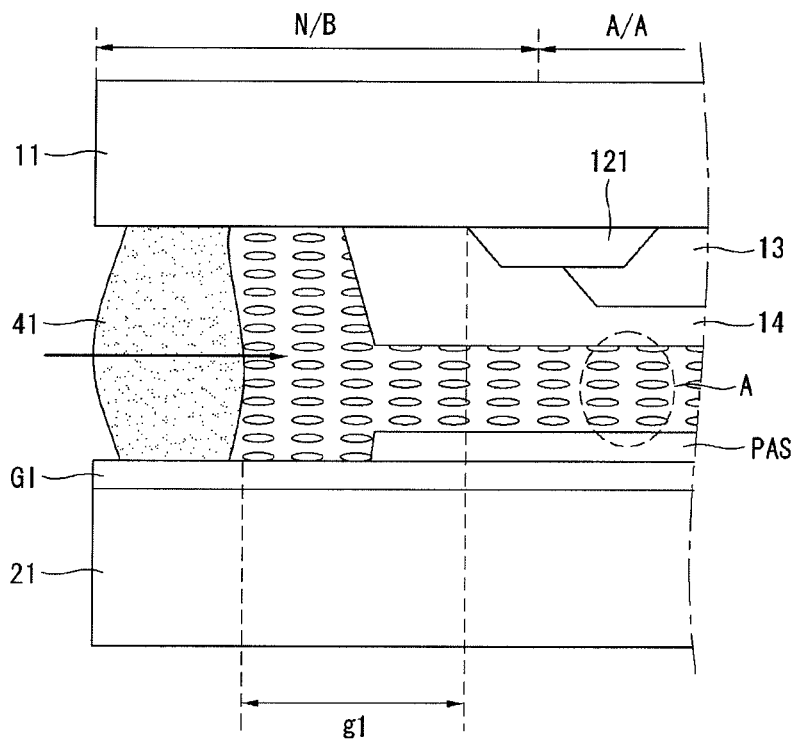
FIG. 8 is a cross-sectional view taken along line VIII-VIII of FIG. 1.

Meanwhile, the black matrix 12 formed in the color filter substrate 10, as illustrated in FIG. 8, includes a first black matrix (not shown) that defines pixels in a display region A/A and a first black matrix 121 that separates the display region and a non-display region N/B. In the exemplary embodiment, the display region A/A is where an image is displayed and the non-display region N/B is where an image is not displayed. The first black matrix 121 has a rectangular plane shape in a closed-loop shape, like the shape of the liquid crystal display pane. The non-display region N/B over the first black matrix 121 is covered by a bezel not to be shown, when configured in a set. A sealant 41 is positioned at the non-display region N/B and seals the portion between the color filter substrate 10 and the thin film transistor array substrate 20 by bonding them. The distance of the sealant 41 from the first black matrix 121 is different in accordance with the position.

The reason for making the distance between the sealant 41 and the first black matrix 121 different is described hereafter.

As described above, the liquid crystal display panel includes the upper polarizer POL1 and the lower polarizer POL2 with the light absorption axes Lx1 and Lx2 perpendicular to each other. The light absorption axis Lx1 of the upper polarizer POL1 is formed in parallel (90°) with the short side of the panel and the light absorption axis Lx2 of the lower polarizer POL2 is formed in parallel (90°) with the long side of the panel to be perpendicular to the light absorption axis Lx1 of the upper polarizer POL1.

Figure 3:
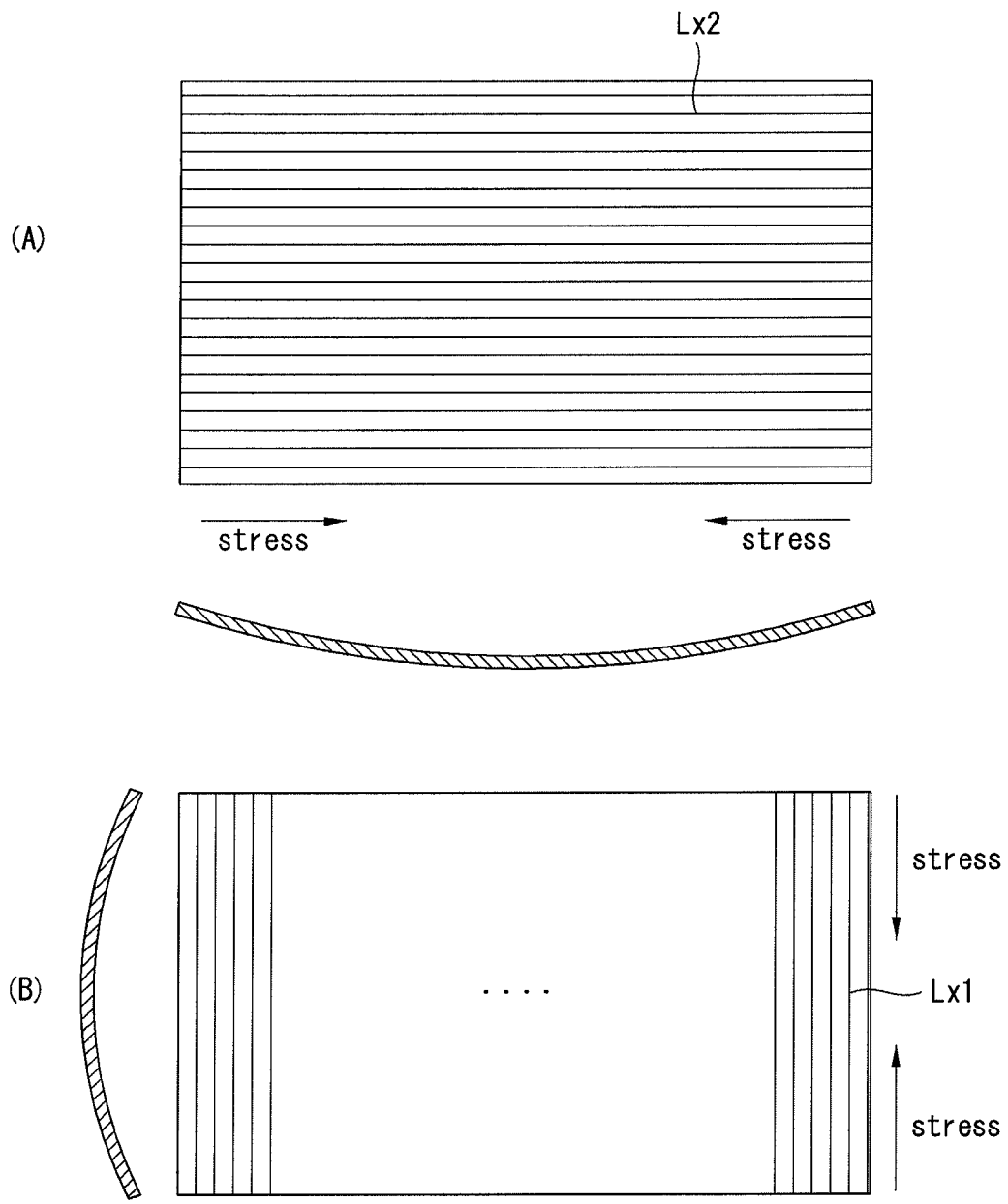
FIGS. 3(A) and 3(B) are diagrams illustrating stress according to a light absorption axis of a polarizer.

The polarizers POL1 and POL2 are deformed into a cup shape that is convex downward while contracting along the light absorption axes Lx1 and Lx2 by vaporization of water under a high-temperature condition. As illustrated in FIG. 3, the upper polarizer POL1 with the light absorption axis of 90° contracts inward from the outside in parallel with the light absorption axis Lx1. Accordingly, the upper polarizer POL1 makes a cup shape with the cross-section, which is taken along the short side, convex downward. Further, the lower polarizer POL2 with the light absorption axis of 0° contracts inward from the outside in parallel with the light absorption axis Lx2. Accordingly, the lower polarizer POL2 makes a cup shape with a convex cross-section that is taken along the long side ((A) in FIG. 3). As the polarizers POL1 and POL2 contract, as described above, stress due to the contraction is transmitted to the liquid crystal display panel, such that the liquid crystal display panel is correspondingly bent. As the liquid crystal display panel is bent, as described above, the cell gap of the liquid crystal panel changes, which causes light leakage.

Figure 4:
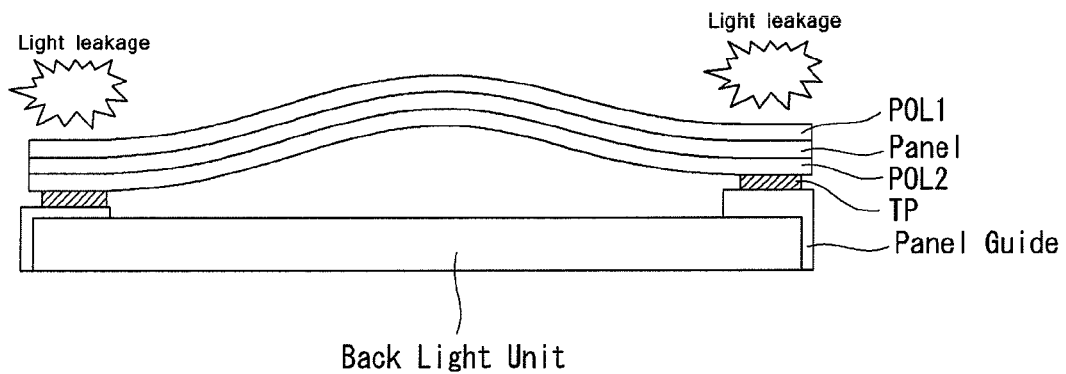
FIGS. 4 to 7 are diagrams illustrating the portions where light leakage is happened in a liquid crystal display panel, and the reason.
Figure 5:
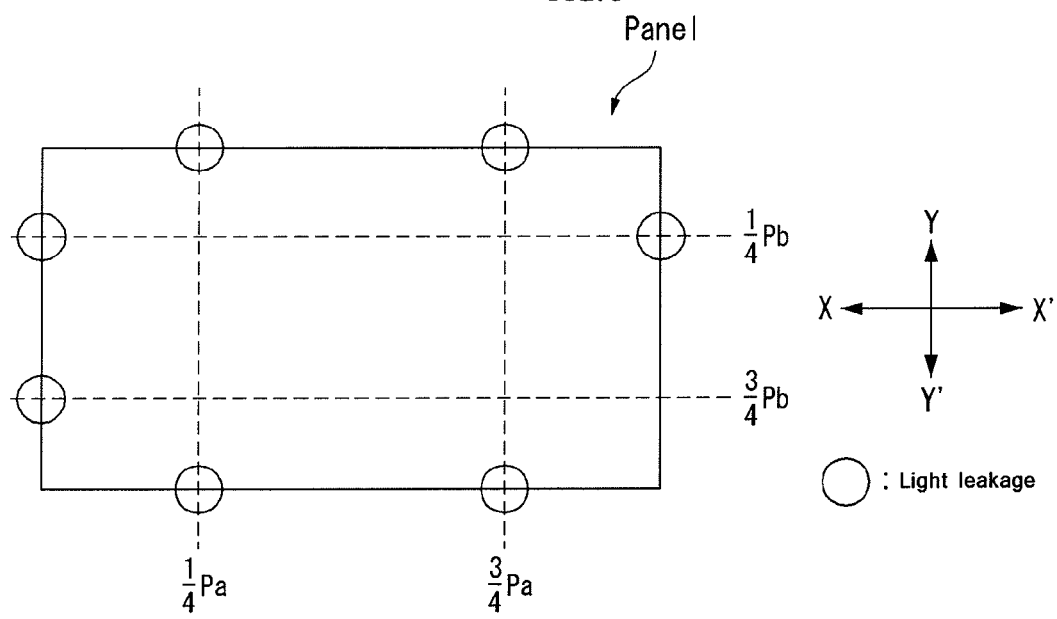

The liquid crystal display panel has the edges fixed to a guide panel by a tape TP to be combined with a backlight unit illustrated in FIG. 4, such that the stress due to the bending of the liquid crystal panel and a reactive force due to the stress are simultaneously applied in the liquid crystal display panel. The stress and reactive force change the cell gap of the liquid crystal display panel, such that light leakage is caused at the portions on the edges, which correspond to the one-quarter point 1/4*Pa and three-quarter point 3/4*Pa in the long axis direction X-X' of the liquid crystal panel, and the portions on the edges, which correspond to the one-quarter point 1/4*Pb and three-quarter point 3/4*Pb in the short axis direction Y-Y' of the liquid crystal panel, as illustrated in FIG. 5.

The reasons for causing light leakage at the portions on the edges are described in detail hereafter.

Figure 6:
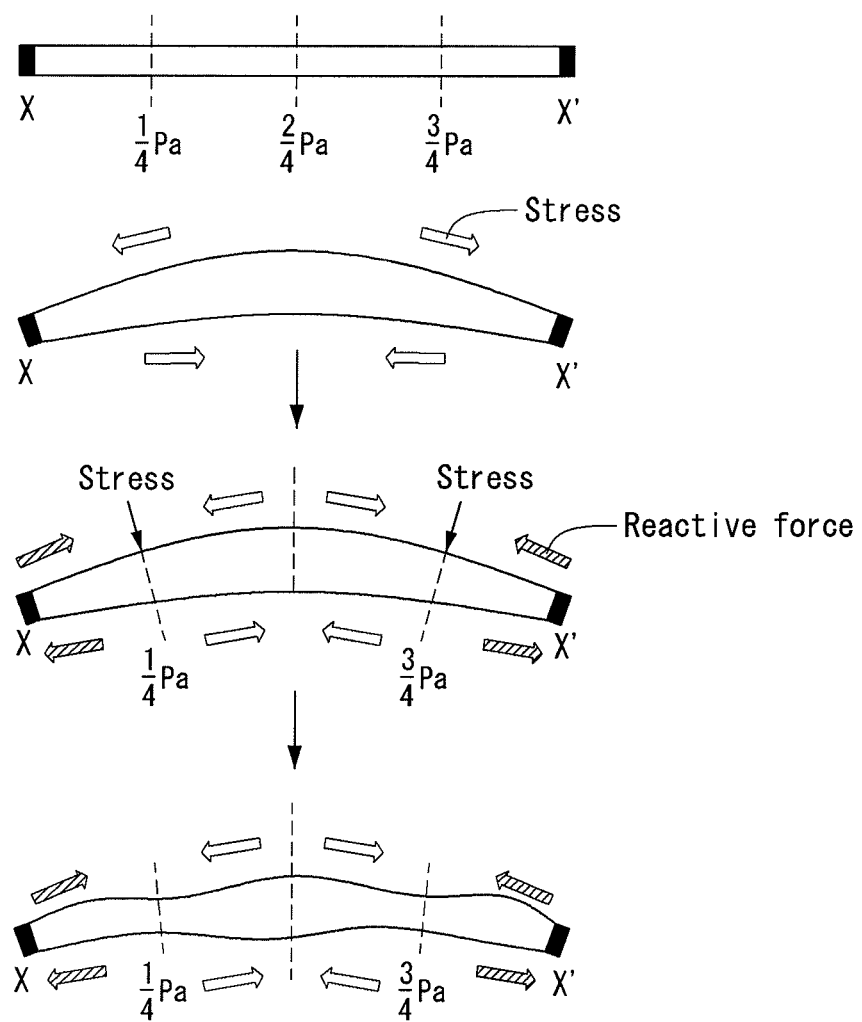

Referring to FIG. 6, the long side-directional compressive stress of the lower polarizer POL2 deforms the liquid crystal panel in a cap shape (inverted U-shape) in the long axis direction X-X'. Accordingly, tensile stress, compressive stress, and reactive force are applied at the top of the liquid crystal panel, the bottom of the liquid crystal panel, and the edges of the liquid crystal panel, respectively. Therefore, stress concentrates on the one-quarter point 1/4*Pa and the three-quarter point 3/4*Pa in the long axis direction X-X' of the liquid crystal panel, such that the arrangement of the liquid crystals are influenced at the points 1/4*Pa and 3/4*Pa, thereby generating light leakage.

Figure 7:
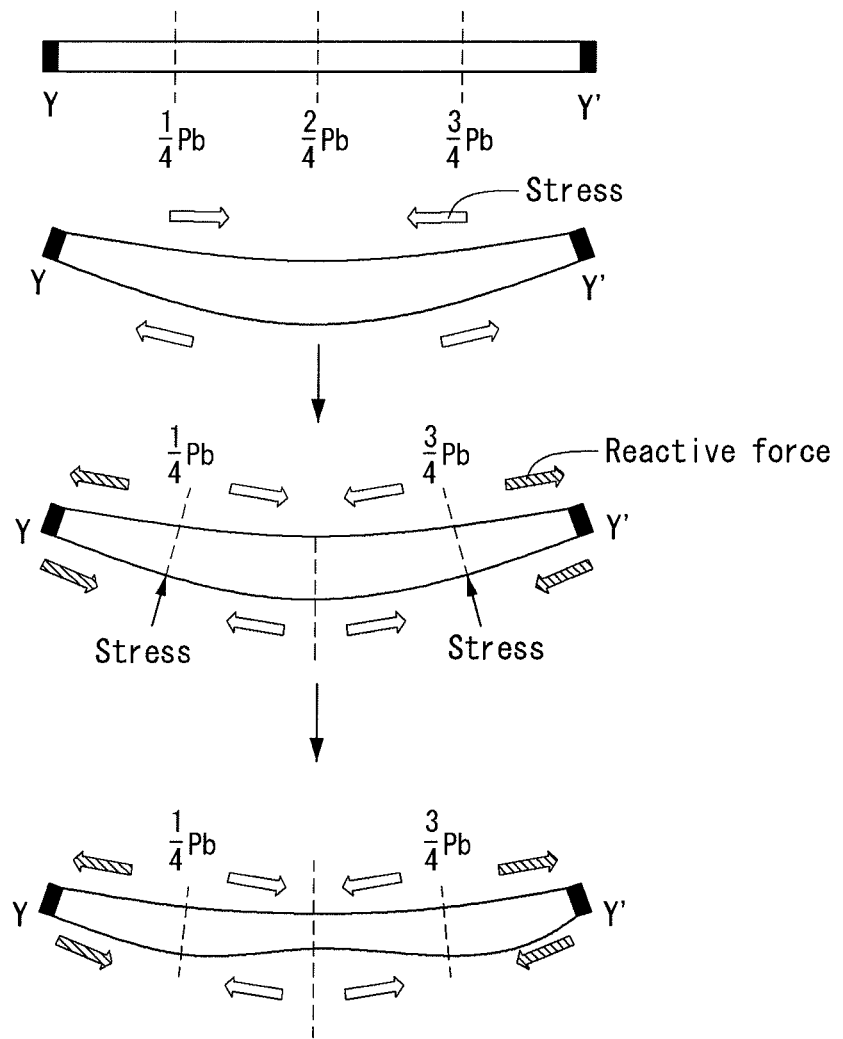

Referring to FIG. 7, the short side-directional compressive stress of the upper polarizer POL1 deforms the liquid crystal panel in a cup shape (U-shape) in the short axis direction Y-Y'. Accordingly, compressive stress, tensile stress, and reactive force are applied at the top of the liquid crystal panel, the bottom of the liquid crystal panel, and the edges of the liquid crystal panel, respectively. Therefore, stress concentrates on the one-quarter point 1/4*Pa and the three-quarter point 3/4*Pa in the short axis direction Y-Y' of the liquid crystal panel, such that the arrangement of the liquid crystals are influenced at the points 1/4*Pa and 3/4*Pa, thereby generating light leakage.

Referring to FIGS. 1 and 2 again, as described above, since light leakage is generated by concentration of the stress due to retraction of the polarizers on the one-quarter points and the three-quarter points on both of the long side and short side of the liquid crystal display panel, the stress concentrating on the points are reduced by correspondingly positioning the sealant 41 at a first distance g1, the farthest from the first black matrix 121, at the one-quarter points and the three-quarter points on both of the long side and short side in the exemplary embodiment.

This is described in detail with reference to FIGS. 8 and 9. FIG. 8 is a cross-sectional view taken along line VIII-VIII of FIG. 1 and FIG. 9 is a cross-sectional view taken along line IX-IX of FIG. 1.

Figure 9:
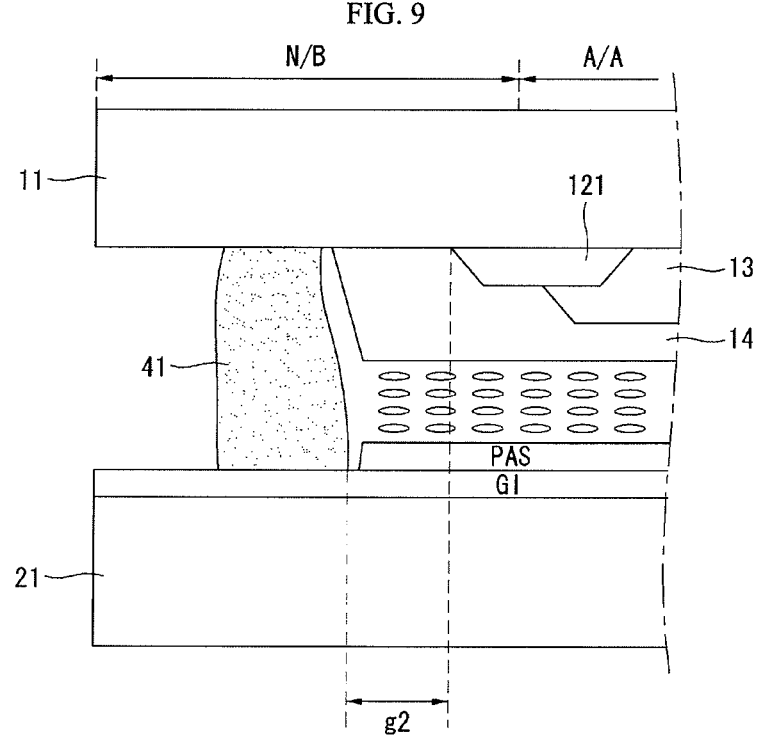
FIG. 9 is a cross-sectional view taken along line IX-IX of FIG. 1.

In FIGS. 8 and 9, the gate insulating layer GI and the passive layer PAS are sequentially formed on the lower glass substrate 21. The gate insulating layer GI is an inorganic layer and the passive layer PAS is an organic layer. In this case, since the sealant 41 is generally made of an inorganic material, the insulating layer GI is exposed in the non-display region N/B to increase bonding performance of the sealant 41.

In the upper glass substrate 11, the first black matrix 121 that separates the display region A/A and the non-display region N/B and the color filter 13 are formed on the same layer, and the planarizing layer 14 is formed on the first black matrix 121 and the color filter 13 to cover them. In general, the planarizing layer 14 is an organic layer, such that the planarizing layer 14 is not formed on the non-display region N/B and the surface of the upper glass substrate 11 is exposed, in order to increase bonding performance with the sealant 41.

Further, the sealant 41 is positioned on the surface of the exposed upper glass substrate 11 and the gate insulating layer GI of the lower glass substrate 21, the portion between the two substrates is sealed. Since the sealant 41 distances itself from the first black matrix 121 by the first distance (the farthest from the first black matrix 121) at the one-quarter points and the three-quarter points on the long side and the short side, the sealant 41 is positioned by a second distance g2 shorter than the first distance g1, at the other points, as illustrated in FIG. 8.

As described above, in the liquid crystal display panel, the stress concentrates on the one-quarter points and the three-quarter points in the long side and short side directions, such that the arrangement of liquid crystals falls into disorder and light leakage is generated. However, as the first distance g1, the distance between the sealant 41 and the first black matrix 121 is increased more than the original distance, the volume per unit between them increases and the amount of liquid crystals increases. Therefore, a relatively larger amount of liquid crystals than the other portions are distributed at the one-quarter points and the three-quarter points in the long side and short side directions.

However, the stress is transmitted inward from the outside of the liquid crystal display panel (in the direction of the arrows of FIG. 8), and as a result, the stress at the one-quarter point and the three-quarter point decreases in inverse proportion to the increased amount of the liquid crystals, such that the light leakage at the points can be reduced.

Figure 10:
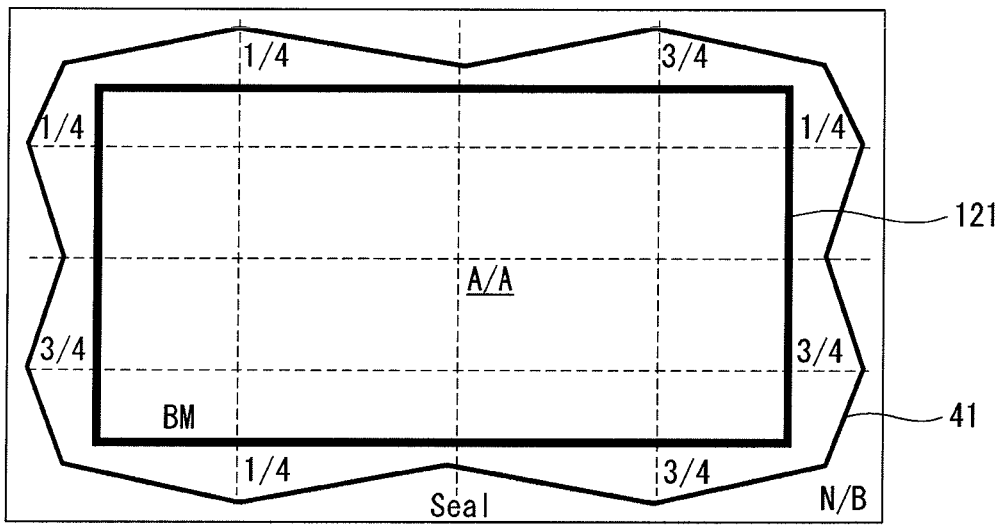
FIGS. 10 to 12 are diagrams illustrating other exemplary embodiments of the present invention.

Referring to FIG. 1 again, the sealant 41 is positioned at the first distance g1 from the first black matrix 121, at the one-quarter point and the three-quarter point to reduce the light leakage at the points. On the other hand, the sealant 41 is positioned closest to the first black matrix 121 at the two-quarter points on the long side and the short side of the liquid crystal display panel. Accordingly, the sealant 41 has a streamlined closed-loop shape substantially in an M-shape at the long side and the short side. Further, the sealant 41 is rounded rather than angled (see FIG. 10) at the breakpoints, that is, the one-quarter, two-quarter, and three-quarter points where the distance between the first black matrix 121 and the sealant 41 changes such that the sealant 41 is not deformed by the stress. When the sealant 41 is angled, the stress transmitted through the sealant 41 collects at the breakpoints and deforms the sealant 41 at the breakpoints. On the other hand, when the portions around the breakpoints are streamlined, the stress doe not concentrate at the breakpoints and is transmitted to other portions, such that deformation of the sealant 41 due to the stress can be reduced.

Figure 11:
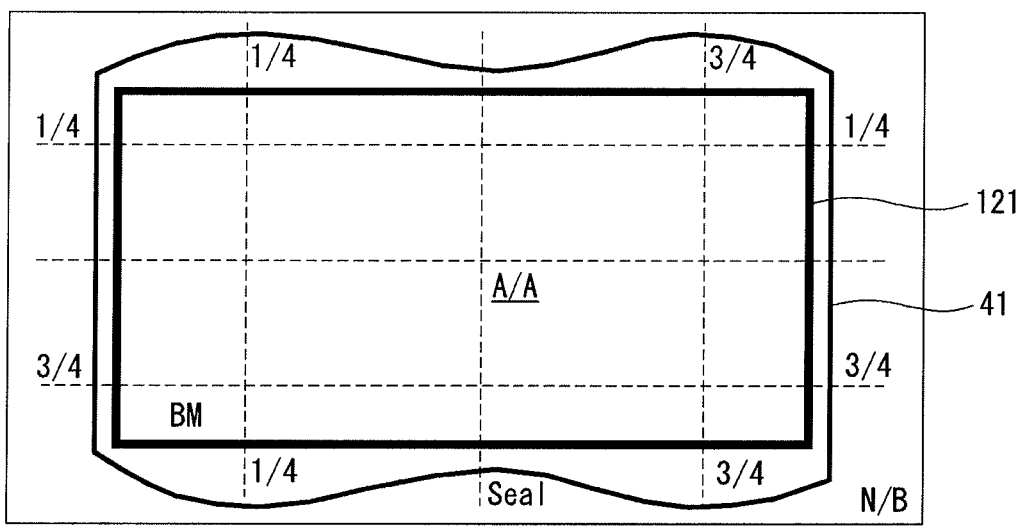
Figure 12:
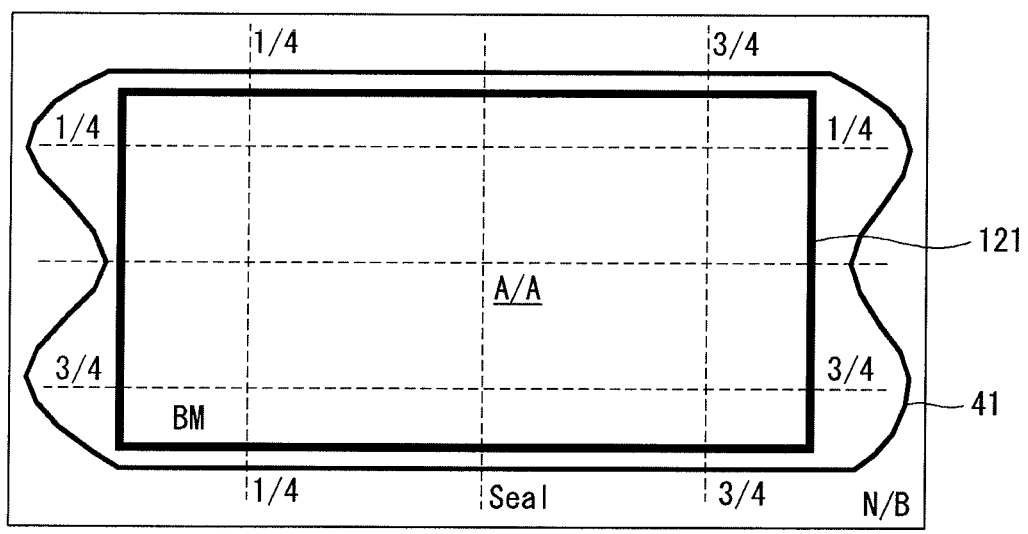

FIGS. 11 to 12 illustrate other exemplary embodiments of the present invention. Comparing the exemplary embodiments with the exemplary embodiment illustrated in FIG. 6, there are differences only in that the distance between the sealant 41 and the first black matrix 121 is adjusted only in the long side direction in the exemplary embodiment illustrated in FIG. 11 and the distance between the sealant 41 and the first black matrix 121 is adjusted only in the short side direction in the exemplary embodiment illustrated in FIG. 12.

It can be seen that the present invention may be changed and modified in various ways from the exemplary embodiments described above, by those skilled in the other without departing from the scope of the present invention. Therefore, the technical scope of the present invention is not limited to the exemplary embodiments described herein, but should be determined by claims.

What is claimed is:

1. A liquid crystal display panel comprising:
 a first substrate having a black matrix that defines a non-display region and a display region;
 a second substrate on which a pixel array is formed;
 a liquid crystal layer between the first substrate and the second substrate; and
 a sealant between the first substrate and the second substrate,
 wherein a distance between the sealant and the black matrix is different in accordance with a position on which the sealant is formed, and
 wherein the black matrix is formed in parallel with at least one side of the first substrate, and the sealant is not formed in parallel with a corresponding portion of the black matrix where the black matrix is formed in parallel with the at least one side of the first substrate, so that the distance between the sealant and the black matrix is different.

2. The liquid crystal display panel of claim 1, wherein the distance between the sealant and the black matrix is formed of an M-shape.

3. The liquid crystal display panel of claim 2, wherein the sealant is the farthest from black matrix at the one-quarter points and the three-quarter points on a long side and a short side of the liquid crystal display panel.

4. The liquid crystal display panel of claim 3, wherein the sealant is the closest to the black matrix at the two-quarter points on the long side and the short side.

5. The liquid crystal display panel of claim 4, wherein the sealant is rounded at the one-quarter point, the two-quarter point, and the three-quarter point.

\* \* \* \* \*